United States Patent
Goyal et al.

(10) Patent No.: US 9,647,947 B2
(45) Date of Patent: May 9, 2017

(54) BLOCK MASK REGISTER KEY PROCESSING BY COMPILING DATA STRUCTURES TO TRAVERSE RULES AND CREATING A NEW RULE SET

(71) Applicant: Cavium, Inc., San Jose, CA (US)

(72) Inventors: Rajan Goyal, Saratoga, CA (US); Kenneth Bullis, Los Altos, CA (US)

(73) Assignee: CAVIUM, INC., San Jose, CA (US)

( * ) Notice: Subject to any disclaimer, the term of this patent is extended or adjusted under 35 U.S.C. 154(b) by 415 days.

(21) Appl. No.: 14/152,817

(22) Filed: Jan. 10, 2014

(65) Prior Publication Data
US 2015/0201047 A1 Jul. 16, 2015

(51) Int. Cl.
*H04L 12/815* (2013.01)
*H04L 12/851* (2013.01)
*H04L 29/06* (2006.01)

(52) U.S. Cl.
CPC .......... *H04L 47/22* (2013.01); *H04L 47/2441* (2013.01); *H04L 63/0263* (2013.01)

(58) Field of Classification Search
None
See application file for complete search history.

(56) References Cited

PUBLICATIONS

Weidel, Development of a Knowledge-based Processor Controller for High Speed Track Trigger Applications [online], 2011 [retrieved on Oct. 18, 2015]. Retrieved from the Internet:<URL:http://www.google.com/url?sa=t&rct=j&q=&esrc=s&source=web&cd=4&url=http%3A%2Fwww.physi.uni-heidelberg.de%2FPublications%2FWeidel_Diplomarbeit.pdf>.*

* cited by examiner

*Primary Examiner* — Stanley K Hill
*Assistant Examiner* — Robert H Bejcek, II
(74) *Attorney, Agent, or Firm* — Brown Rudnick LLP; Nikhil Patel

(57) ABSTRACT

A packet classification system, methods, and corresponding apparatus are provided for enabling packet classification. A processor of a routing appliance coupled to a network compiles data structures to process keys associated with a particular block mask register (BMR) of a plurality of BMRs. For each BMR of the plurality of BMRs, the processor identifies at least one of or a combination of: i) at least a portion of a field of a plurality of rules and ii) a subset of fields of the plurality of fields to be masked. The processor also builds at least one data structure used to traverse a plurality of rules based on the identified at least one of or a combination of: i) at least a portion of a field of a plurality of rules and ii) a subset of fields of the plurality of fields to be masked.

15 Claims, 20 Drawing Sheets

300

| RULE | FIELD-1 (X-RANGE) | FIELD-2 (Y-RANGE) |
|------|-------------------|-------------------|
| R1 | 0-31 | 0-255 |
| R2 | 0-255 | 128-131 |
| R3 | 64-71 | 128-255 |
| R4 | 67-67 | 0-127 |
| R5 | 64-71 | 0-15 |
| R6 | 128-191 | 4-131 |
| R7 | 192-192 | 0-255 |

|  | F1<br>TCP source<br>port<br>16 bits exact | F2<br>TCP dest<br>port<br>16 bits range | F3<br>Protocol<br>8 bits mask | F4<br>IP src<br>address<br>32 bits prefix | F5<br>IP dest<br>address<br>32 bits prefix |
|---|---|---|---|---|---|
| Rule R1 | 0X1000 | 1-1024 | 0X06/0XFF | 127.0.0.0/8 | 1.2.3.4/32 |
| Rule R2 | 0X1001 | 100-200 | 0X00/0X00 | A.B.C.D/24 | A.B.0.0/16 |
| Rule R3 | 0X003A | * | 0X17/0XFF | 1.2.3.4/32 | 8.0.0.0/8 |

1500

BMR masks

| BMR(s) | F1 | F2 | F3 | F4 | F5 |
|---|---|---|---|---|---|
| BMR 1 | 0X0000 | 0X0000 | 0XFF | 0XFFFFFFFF | 0XFFFFFFFF |
| BMR 2 | 0XFFFF | 0X0000 | 0XFF | 0XFFFFFFFF | 0X00000000 |
| BMR 3 | 0X0001 | 0XFFFF | 0XF1 | 0XFFFF0000 | 0XFFFFFFFF |

1501

Modified field types and rules

| | F1<br>16 bits<br>mask | F2<br>16 bits<br>range | F3<br>8 bits<br>mask | F4<br>32 bits<br>mask | F5<br>32 bits<br>prefix |
|---|---|---|---|---|---|
| R 1 | 0X1000/0XFFFF | 1 - 1024 | 0X06/0XFF | 0XFF000000/0XFF000000 | 1.2.3.4/32 |
| R 2 | 0X1001/0XFFFF | 100 - 200 | 0X00/0X00 | 0X0A0B0C0D/0XFFFFFF00 | A.B.0.0/16 |
| R 3 | 0X003A/0XFFFF | * | 0X17/0XFF | 0X01020304/0XFFFFFFFF | 8.0.0.0/8 |

1520

BLOCK MASK REGISTER KEY PROCESSING BY COMPILING DATA STRUCTURES TO TRAVERSE RULES AND CREATING A NEW RULE SET

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification.

Internet routers classify packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

A classifier, using a set of filters or rules, specifies the flows, or classes. For example, each rule in a firewall might specify a set of source and destination addresses and associate a corresponding deny or permit action with it. Alternatively, the rules might be based on several fields of a packet header including layers 2, 3, 4, and 5 of the OSI model, which contain addressing and protocol information.

On some types of proprietary hardware, an Access Control List (ACL) refers to rules that are applied to port numbers or network daemon names that are available on a host or layer 3 device, each with a list of hosts and/or networks permitted to use a service. Both individual servers as well as routers can have network ACLs. ACLs can be configured to control both inbound and outbound traffic.

SUMMARY

Embodiments of the present disclosure include methods, systems, apparatus, or computer readable medium, with program codes embodied thereon, for compiling data structures to process keys associated with a particular block mask register (BMR) of a plurality of BMRs.

One embodiment is a method that includes, for each BMR of the plurality of BMRs, a) identifying at least one of or a combination of: i) at least a portion of a field of a plurality of rules and ii) a subset of fields of the plurality of fields to be masked; and b) building at least one data structure used to traverse a plurality of rules based on the identified at least one of or a combination of: i) at least a portion of a field of a plurality of rules and ii) a subset of fields of the plurality of fields to be masked The method can also include, for each BMR of the plurality of BMRs, creating a new rule set from the plurality of rules, wherein the identified at least one of or a combination of: i) the at least a portion of a field of the plurality of rules and ii) the subset of fields of the plurality of fields to be masked is masked from the new rule set. In addition, the method cal include mapping the new rule set to a corresponding data structure traversable on a plurality of rules only on the identified at least one of or a combination of: i) at least a portion of a field of a plurality of rules and ii) a subset of fields of the plurality of fields to be masked.

The method can also include, for each BMR of the plurality of BMRs, mapping the at least one data structure to a single instance of a rules set, wherein the rule set is an n-tuple rule set and includes each field of the n-tuple rule set. Also, the method can further include: a) enabling a search processor to mask the identified at least one of or a combination of: i) the at least a portion of a field of the plurality of rules and ii) the subset of fields of the plurality of fields to be masked from the rules set based on information identifying a corresponding BMR associated with the at least one data structure; and b) enabling search processor to mask a search request key based on a subject BMR of the plurality of BMRs passed with the search request key.

The method can also include: i) identifying a set of BMRs of the plurality of BMRs with intersecting fields; ii) grouping the identified set of BMRs into a group; iii) defining a group BMR masking all but the intersecting fields in the group; and iv) building the at least one data structure for the group based on the new defined group BMR.

Another embodiment is an apparatus. The apparatus includes a memory and one or more processors coupled to the memory. The one or more processors are configured to, for each BMR of the plurality of BMRs, a) identify at least one of or a combination of: i) at least a portion of a field of a plurality of rules and ii) a subset of fields of the plurality of fields to be masked; and b) build at least one data structure used to traverse a plurality of rules based on the identified at least one of or a combination of: i) at least a portion of a field of a plurality of rules and ii) a subset of fields of the plurality of fields to be masked.

BRIEF DESCRIPTION OF THE DRAWINGS

The foregoing will be apparent from the following more particular description of example embodiments of the disclosure, as illustrated in the accompanying drawings in which like reference characters refer to the same parts throughout the different views. The drawings are not necessarily to scale, emphasis instead being placed upon illustrating embodiments of the present disclosure. The accompanying drawings, which are incorporated in and constitute a part of this specification, illustrate several embodiments consistent with the disclosure and together with the description, serve to explain the principles of the disclosure.

FIG. 3 illustrates a classifier table including rules for classifying a packet, in accordance with an example embodiment of the present disclosure.

DETAILED DESCRIPTION

A description of example embodiments of the invention follows.

The teachings of all patents, published applications and references cited herein are incorporated by reference in their entity.

Although packet classification has been widely studied for a long time, researchers are still motivated to seek novel and efficient packet classification solutions due to: i) the continual growth of network bandwidth, ii) increasing complexity of network applications, and ii) technology innovations of network systems.

Explosion in demand for network bandwidth is generally due to the growth in data traffic. Leading service providers report bandwidths doubling on their backbone networks about every six to nine months. As a consequence, novel packet classification solutions are required to handle the exponentially increasing traffics on both edge and core devices.

Complexities of network applications are increasing due to the increasing number of network applications being implemented in network devices. Packet classification is widely-used for various kinds of applications, such as service-aware routing, intrusion prevention and traffic shaping. Therefore, novel solutions of packet classification must be more intelligent to handle diverse types of rule sets without significant loss of performance.

In addition, new technologies, such as multi-core processors provide unprecedented computing power, as well as highly integrated resources. Thus, novel packet classification solutions must be well suited to advanced hardware and software technologies.

Before describing example embodiments in detail, an example packet classification system and related methods are described immediately below to help the reader understand the inventive features described herein.

Existing packet classification methods trade memory for time. Although the tradeoffs have been constantly improving, the time taken for a reasonable amount of memory is still generally poor. Because of problems with existing methods, vendors use ternary content-addressable memory (TCAM), which uses brute-force parallel hardware to simultaneously check packets against all rules. The main advantages of TCAMs over existing methods are speed and determinism (TCAMs work for all databases).

A TCAM is a hardware device that functions as a fully associative memory. A TCAM cell stores three values: 0, 1, or 'X,' which represents a don't-care bit and operates as a per-cell mask enabling the TCAM to match rules containing wildcards (e.g., don't care bits). In operation, a whole packet header can be presented to a TCAM to determine which entry (rule) it matches. However, the complexity of TCAMs has permitted only small, inflexible, and relatively slow implementations that consume a lot of power. Therefore, a need continues for efficient methods operating on specialized data structures.

Figure 1:
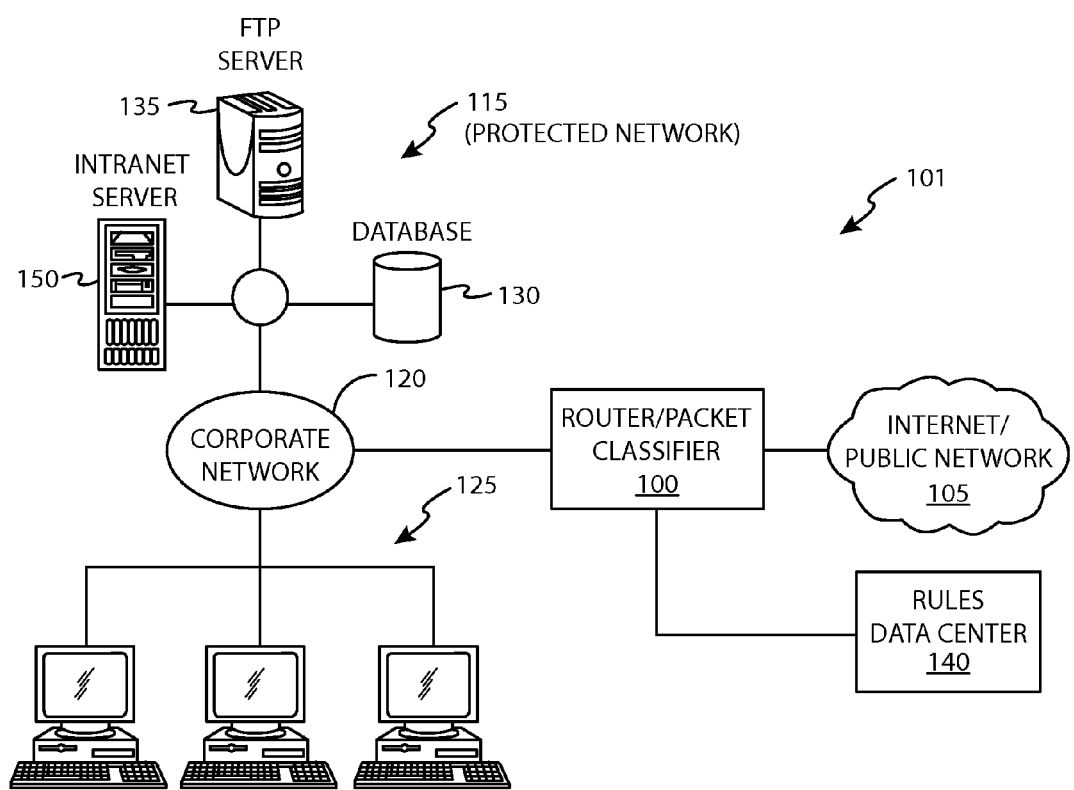
FIG. 1 is a block diagram illustrating a system in which a packet classifier operates to classify packets to provide internet services to a private network, in accordance with an example embodiment of the present disclosure.

FIG. 1 is a block diagram illustrating a system 101 that includes a router/packet classifier 100, protected network 115, and a public network 105 in accordance with an example embodiment of the present disclosure. The public network 105 may comprise an unsecured wide-area network (WAN), such as the Internet, a wireless network, a local-area network, or another type of network. Protected network 115 may comprise a secured computer network such as a local-area network (LAN) in an office or a data center. As illustrated, the LAN may be a corporate network 120 including a plurality of work stations 125. The plurality of work stations 125 are operatively coupled to database 130, FTP (file transfer protocol) server 135, and intranet server 150.

In system 101, the router 100 is connected to the public network 105 and protected network 115 such that network traffic flowing from public network 105 to protected network 115 flows first to the router 100. The router 100 may be a stand-alone network appliance, a component of another network appliance (e.g., firewall appliance), a processor that executes software instructions on a network appliance, or another configuration. The router 100 may be connected to a rules datacenter 140. In general, router 100 inspects network traffic from public network 105 and determines what actions to perform on the network traffic. For example, router 100 classifies packets to implement a number of advanced internet services such as routing, rate limiting, access control in firewalls, virtual bandwidth allocation, policy-based routing, service differentiation, load balancing, traffic shaping, and traffic billing. These services require the router 100 to classify incoming packets into different flows and then to perform appropriate actions depending on this classification.

Figure 2:
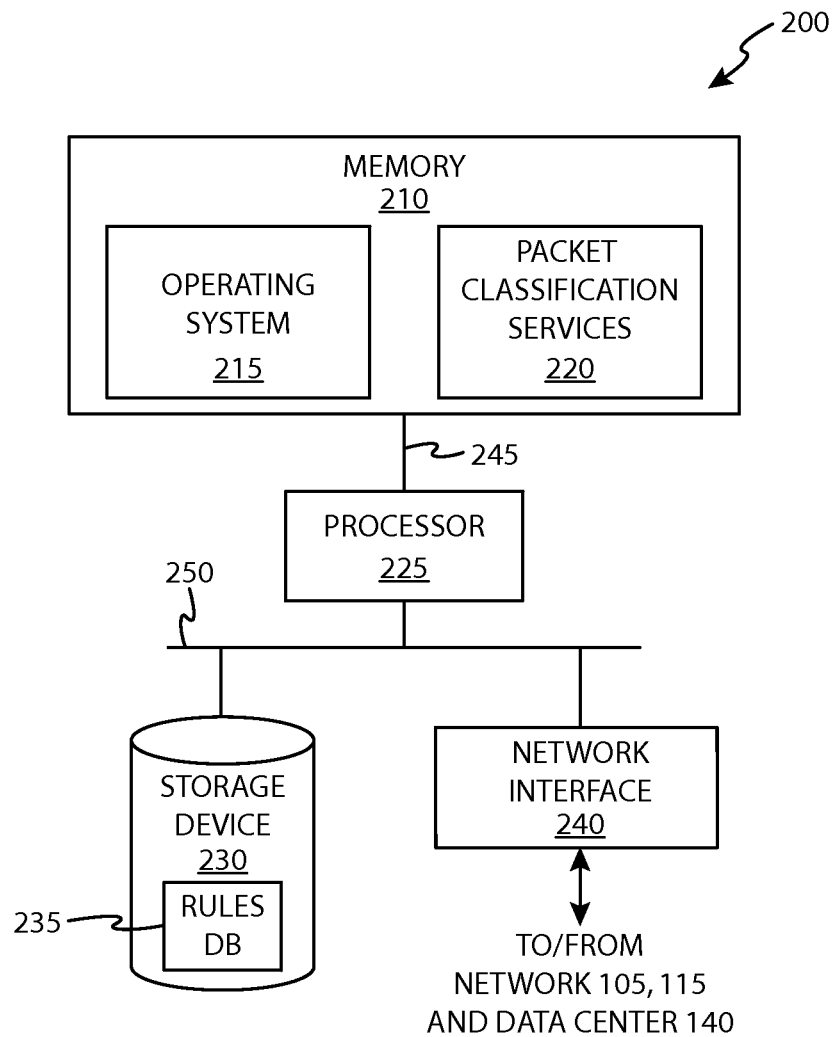
FIG. 2 is a block diagram of a router that may classify packets according to techniques disclosed herein.

FIG. 2 is a high-level block diagram of an exemplary router 200 that may be used with embodiments described herein. Router 200 comprises a memory 210 coupled to a processor 225 via a memory bus 245 and, a storage device 230 and a network interface 240 coupled to the processor 225 via an input/output (I/O) bus 250. It should be noted that the router 200 may include other devices, such as keyboards, display units and the like. The network interface 240 interfaces the router 200 with the secured network 115, public network 105, and rules datacenter 140 and enables data (e.g., packets) to be transferred between the router and other nodes in the system 101. To that end, network interface 240 comprises conventional circuitry that incorporates signal, electrical and mechanical characteristics, and interchange circuits, needed to interface with the physical media of system 101 and protocols running over that media.

The memory 210 is a non-transitory computer-readable medium implemented as a RAM comprising RAM devices, such as DRAM devices and/or flash memory devices. Memory 210 contains various software and data structures used by the processor 225 including software and data structures that implement aspects of the embodiments described herein. Specifically, memory 210 includes an operating system 215 and packet classification services 220. The operating system 215 functionally organizes the router 200 by invoking operations in support of software processes and services executing on router 200, such as packet classification services 220. Packet classification services 220, as will be described below, comprises computer-executable instructions to compile a decision tree data structure from a given set of rules and walk incoming data packets through the compiled decision tree data structure.

Storage device 230 is a conventional storage device (e.g., disk) that comprises rules database (DB) 235 which is a data structure that is configured to hold various information used to compile a decision tree data structure from a given set of rules. Information may include rules having a plurality of fields corresponding to headers of incoming data packets.

In an example embodiment, the router 200 can perform packet classification using a packet classifier, also called a policy database, flow classifier, or simply a classifier. The packet classifier can be included as part of the router's packet classification services 220. A classifier is a collection of rules or policies. Packets received are matched with rules, which determine actions to take with a matched packet. Generic packet classification requires a router to classify a packet on the basis of multiple fields in a header of the packet. Each rule of the classifier specifies a class that a packet may belong to, according to criteria on 'F' fields of the packet header, and associates an identifier (e.g., class ID) with each class. For example, each rule in a flow classifier is a flow specification, in which each flow is in a separate class. The identifier uniquely specifies an action associated with each rule. Each rule has 'F' fields. An ith field of a rule R, referred to as R[i], is a regular expression on the ith field of the packet header. A packet P matches a particular rule R if for every i, the ith field of the header of P satisfies the regular expression R[i].

Classes specified by the rules may overlap. For instance, one packet may match several rules. In this case, when several rules overlap, an order in which the rules appear in the classifier may determine the rule's relative priority. In other words, a packet that matched multiple rules belongs to the class identified by the identifier (class ID) of the rule among them that appears first in the classifier. Alternatively, a unique priority associated with a rule may determine its priority, for example, the rule with the highest priority.

Packet classifiers may analyze and categorize rules in a classifier table and create a decision tree that is used to match received packets with rules from the classifier table. A decision tree is a decision support tool that uses a tree-like graph or model of decisions and their possible consequences, including chance event outcomes, resource costs, and utility. Decision trees are commonly used in operations research, specifically in decision analysis, to help identify a strategy most likely to reach a goal. Another use of decision trees is as a descriptive means for calculating conditional probabilities. Embodiments described herein utilize decision trees to selectively match a received packet with a rule in a classifier table to determine how to process the received packet.

A decision tree of rules, or tree, represents a set of rules. The decision tree may also be called a Rule Compiled Data Structure (RCDS) or a performance tree. The tree is a binary data structure having nodes and leaves. Each leaf of the tree points to a subset of the rules, called a bucket of rules, or bucket. Each of the buckets represents a subset of the rules. Each bucket is a data structure (e.g., an array) containing pointers to rules, which are stored in a rule table. Rules (or pointers to rules) within a bucket are ordered by priority (e.g., in increasing or decreasing priority). A rule table is a data structure (e.g., an array) containing the rules. Rules within the rule table may be ordered or unordered.

FIG. 3 illustrates a classifier table 300 including rules for classifying a packet. As illustrated, the classifier table contains seven rules (R1-R7), each containing two fields, Field-1 (310), and Field-2 (315). Although the table illustrates rules being 2-tuple (e.g., containing only two fields), it should be noted that rules may contain an n number of fields and be n-tuple. Each rule specifies a range of values (e.g., Internet Protocol (IP) addresses or Layer 4 ports or protocols) in each dimension (field). For example, Field-1 (310) may be represented in the x-dimension of an x/y graph, while Field-2 (315) may be represented in the y-dimension of an x/y graph.

Figure 4:
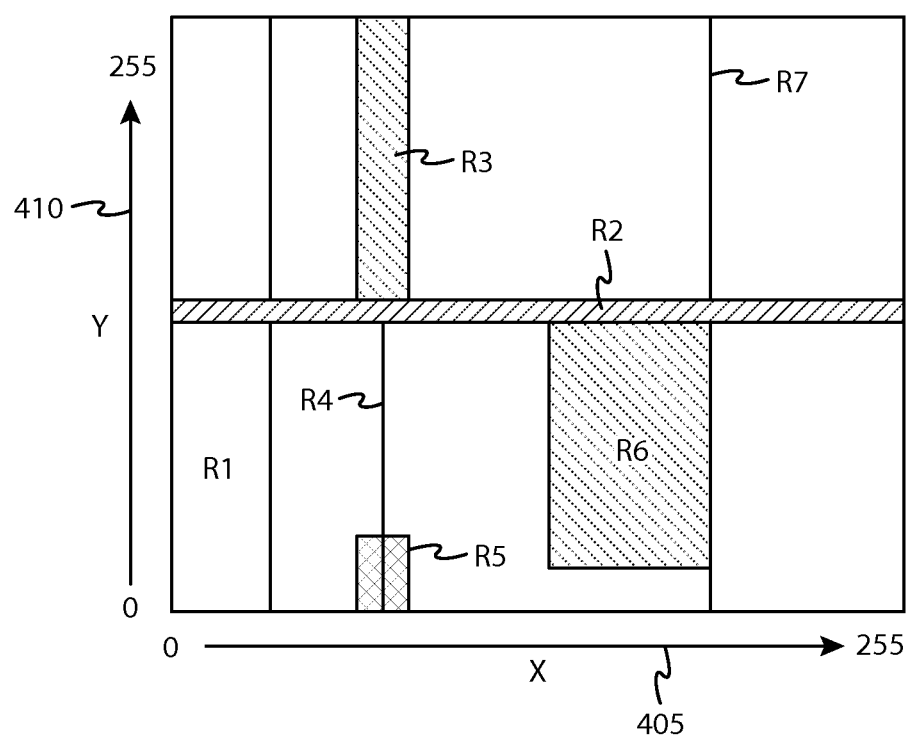
FIG. 4 illustrates a geometric representation of the rules of the classifier table illustrated in FIG. 3, in accordance with an example embodiment of the present disclosure.

FIG. 4 illustrates a geometric representation of the rules of the classifier table 300. The rules range from values 0-255 in both the x-dimension 405 and y-dimension 410. As illustrated, each dimension of the graph is subdivided based on the ranges of each field of each rule from classifier table 300.

Figure 5:
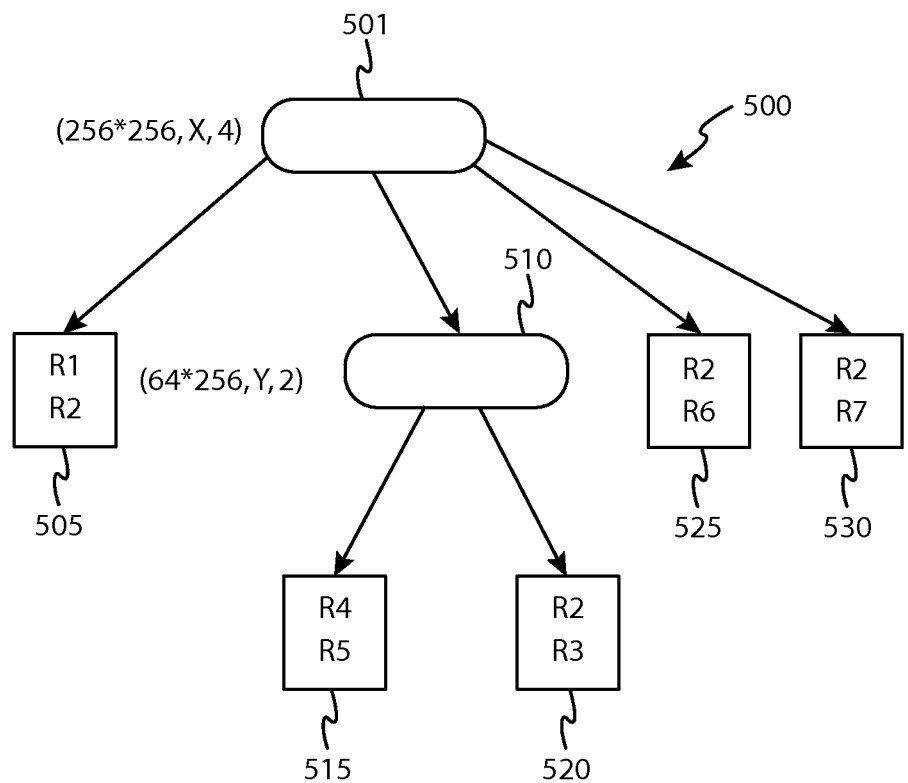
FIG. 5 illustrates a decision tree data structure compiled from the classifier table illustrated in FIG. 3, in accordance with an example embodiment of the present disclosure.

FIG. 5 illustrates a decision tree data structure 500 compiled from the classifier table 300. The decision tree 500 contains a set of elements called nodes (501, 505, 510, 515, 520, 525, 530) that are empty or satisfy one of the following conditions: i) there is a distinguished node r, called the root node, and ii) the remaining nodes are divided into disjoint subsets, each of which is a sub-tree. As illustrated, node 501 is the root node of the decision tree and a parent node of nodes 505, 510, 525, and 530, which are considered child nodes of root node 501. The degree of a node is the number of nonempty sub-trees the node contains. A node with degree zero is considered a leaf node. Thus, nodes 505, 515, 520, 525, and 530 are considered leaf nodes. Nodes with a positive degree are internal nodes (e.g., node 510).

Each node of the decision tree 500 contains a subset of rules of a classifier table. As stated above, each rule has F' fields and an ith field of a rule R, referred to as R[i], is a regular expression on the ith field of a received packet header. A packet P matches a particular rule R if for every i, the ith field of the header of P satisfies the regular expression R[i]. Thus, when a packet is received, a decision tree is walked (e.g., by a runtime walker) to determine a matching rule, which is used to determine an action to take with the received packet. The runtime walker can be part of the packet classification services (e.g., the packet classification services 220) of, for example, a router (e.g., router 200 of FIG. 2).

For example, if a packet is received that contains headers matching rule R7 (see FIG. 3), decision tree 500 is walked (e.g., traversed) to find matching rule R7. Thus, the packet is first passed through root node 501, which contains all rules of the packet classification table, which has been cut into four children. Cutting a node refers to subdividing the node into n number of child nodes. The n number of child nodes created corresponds to the number of cuts (subdivisions) of the node that are made. In this example, the rules in root node 501 have been subdivided into four distinct ranges (corresponding to each child node 505, 510, 525, and 530). Thus, it is determined that the packet should be passed to child node 530 that contains a subset of rules having fields within a range of each header of the received packet. After the packet is passed to node 530, the packet is matched with rule R7.

Example embodiments described herein build a decision tree data structure by carefully preprocessing a classifier. Each time a packet arrives, the run time walker traverses the decision tree to find a leaf node that stores a small number of rules. Once the leaf node is reached, a linear search of the rules within the leaf node occurs to find a matching rule.

As stated herein, a router (e.g., router 100 of FIG. 1) inspects network traffic and determines what actions to perform on the network traffic. For example, the router classifies packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

Figure 6:
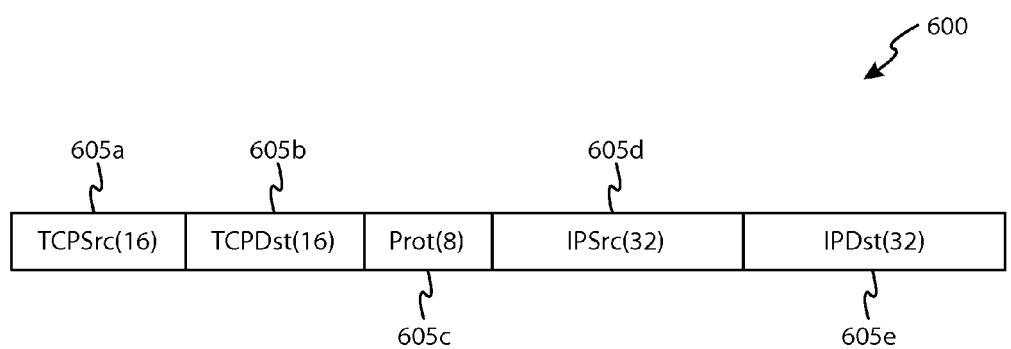
FIG. 6 illustrates an example key generated from a packet received by a router, in accordance with an example embodiment of the present disclosure.

In order to process and classify packets, the router matches the packets with rules, which determine actions to take with a matched packet. For instance, packet classification requires the router to classify a packet on the basis of multiple fields in a header of the packet. In an embodiment, the router receives the packet and creates a key based on the multiple fields in the header of the packet. FIG. 6 illustrates an example key 600 generated from a packet (not shown) received by the router. In particular, the router extracts information from the multiple fields in the header of the packet to form the key 600. The key 600 is 104 bits in size. The key 600 includes five fields 605a-e corresponding to the multiple fields in the header of the packet. In this example embodiment, the key includes: i) field 605a associated with a TCP source address having a size of 16 bits, ii) field 605b associated with a TCP destination address having a size of 16 bits, iii) field 605c associated with a Protocol identifier having a size of 8 bits, iv) field 605d associated with an IP source address having a size of 32 bits, and v) field 605e associated with an IP destination address having a size of 32 bits.

The router passes the key 600 to a search processor (e.g., search processor 715 of FIG. 7) of the router to match the packet with a flow processing rule. For instance, each rule has 'F' fields. An ith field of a rule R, referred to as R[i], is a regular expression on the ith field of the packet header. A packet P matches a particular rule R if for every i, the ith field of the header of P satisfies the regular expression R[i]. Thus, the search processor returns a rule R that matches the packet header information contained in the key 600.

Figure 7:
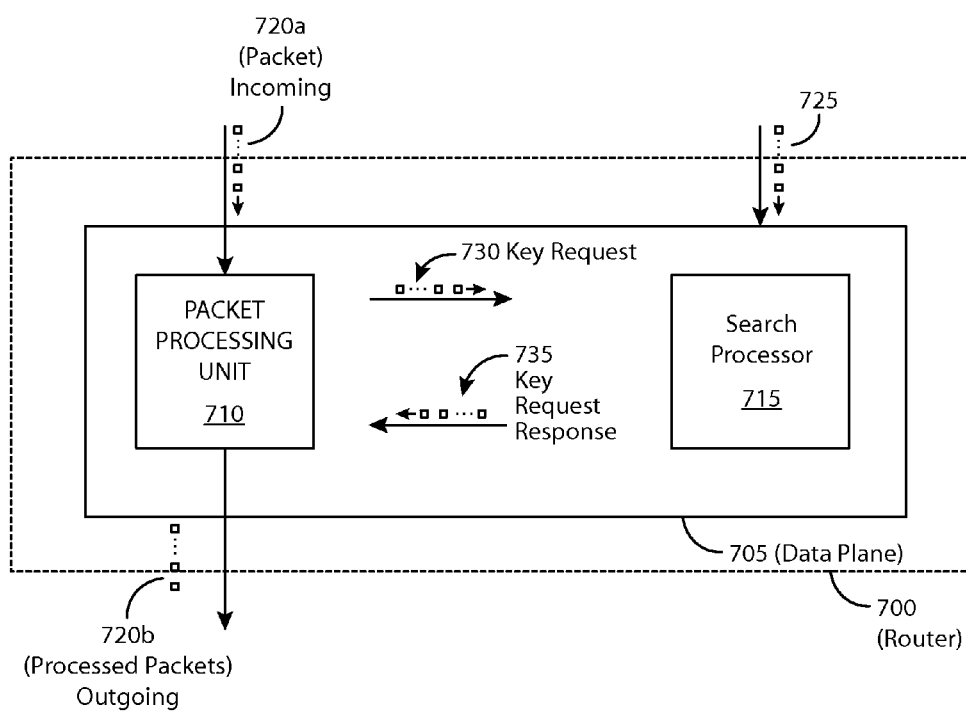
FIG. 7 is a functional block diagram of a data plane of a router used to process incoming packets, in accordance with an example embodiment of the present disclosure.

FIG. 7 is a functional block diagram of a data plane 705 of a router 700 used to process incoming packets 720, in accordance with an example embodiment of the present disclosure. As stated above, the router 700 classifies the packets 720 to implement a number of advanced internet services such as routing, rate limiting, access control in firewalls, virtual bandwidth allocation, policy-based routing, service differentiation, load balancing, traffic shaping, and traffic billing.

In particular, the router 700 receives the incoming packets 720 from a network (e.g., public network 105 of FIG. 1), via a packet processing unit 710 in a data plane 705 of the router 700. The packet processing unit 710 processes each of the packets 720. In order to process each of the packets 720, the packet processing unit 710 creates at least one processing key (e.g., key 600 of FIG. 6) for each of the packets 720. In particular, the packet processing unit 710 extracts information held in at least one field of at least one header of each the incoming packets 720. The extracted information is then used to create the at least one processing key for each of the packets 720.

The packet processing unit 710 sends a request 730 to the search processor 715 for information used to process the incoming packets 720 (e.g., a rule R). For example, the processing unit 710 requires information on how to classify the packet to implement at least one of the aforementioned internet services. In an example embodiment, the request 730 includes the at least one key.

The search processor 715 receives the request 730, including the at least one key, from the packet processing unit 710. In response to receiving the request 730, the search processor matches the at least one key with a rule R of a set of processing rules 725 received from a rules compiler (not shown). In particular, the search processor 715 selects a search tree, received from the compiler, to traverse the set of processing rules 725. The packet search processor 715 can select a search tree based on information contained in the request 730 (e.g., fields in the key of the key request 730, size of the key, and number of keys). Once the search tree is selected, the search processor 715 walks the key through the search tree (e.g., using a runtime walker). The search processor 715 reaches a leaf node of the search tree and performs a linear search of all the rules in the leaf node. The search processor then identifies a rule that matches the key. In particular, the matching rule is a rule that includes fields and corresponding field values matching information in the at least one key. The search processor 715 provides the packet processing unit 710 a key request response 735 that includes information associated with the rule. The packet processing unit 710 receives the key request response 735 and processes the incoming packets 720 according to processing information contained in the rule.

Figure 8:
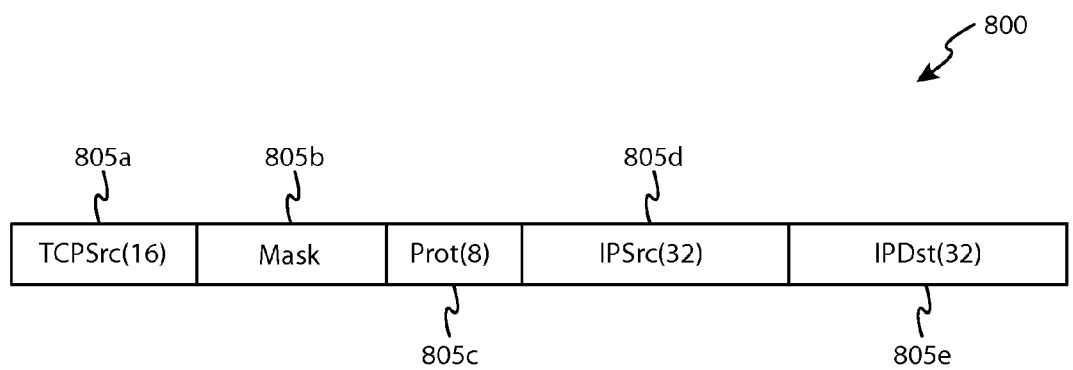
FIG. 8 illustrates a key mask that can be applied to a search request, in accordance with an example embodiment of the present disclosure.

In some embodiments of the present disclosure, a key mask is a mask applied to the search request 730 when the key is presented to the search processor 715 for lookup. The key mask causes arbitrary bits of the key as well as corresponding bits of the rules set, 725, to be ignored during the search. It might be used for example to ignore a certain field of the key if that field value is unknown. FIG. 8 illustrates an example key mask 800 that can be applied to the search request 730. In particular, the key mask 800 includes five fields 805*a-e* corresponding to the multiple fields in the key 600. In this example embodiment, the key mask includes: i) field 805*a* associated with a TCP source address, ii) field 805*b* indicating that the TCP destination address field is to be masked, iii) field 805*c* associated with a Protocol identifier, iv) field 805*d* associated with an IP source address, and v) field 805*e* associated with an IP destination address. Thus, when the key mask 800 is applied to key 600, the search processor 715 performs a search on each field of the key 600 except field 605*b*. In other embodiments, a key mask can also be used to mask out individual bits of a field and not just entire fields.

Figure 9:
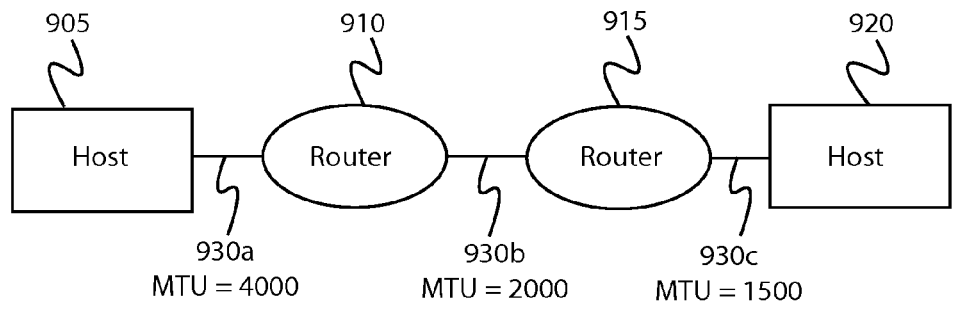
FIG. 9 illustrates a set of partial keys created from an original key generated from a packet received by a router, in accordance with an example embodiment of the present disclosure.

FIG. 9 illustrates an example network 900 in which a key mask is applied to search requests. It should be noted that a key mask can be utilized in many scenarios and the example illustrated by FIG. 9 is just one embodiment in which a key mask is utilized. The network 900 includes a host source node 905 and host destination node 920. The nodes 905 and 920 can be, for example, computing devices used to transmit information within the network 900. In an example, the host source node 905 transmits data packets (not shown) to the host destination node 920 via router 910 and router 915. Each node in the network 900 is connected via communication links 930*a-c*. In order to transmit the data packets across the network 900, a size of the data packets cannot exceed a maximum transmit unit (MTU) of any of the communication links 930*a-c*. For example, the MTU of communication link 930*a* is 4000 bytes. In addition, the MTU of communication links 930*b-c* is 2000 bytes and 1500 bytes, respectively. Thus, for instance, a data packet that is transmitted from host source node 905 to router 910 cannot exceed 4000 bytes.

Figure 10:
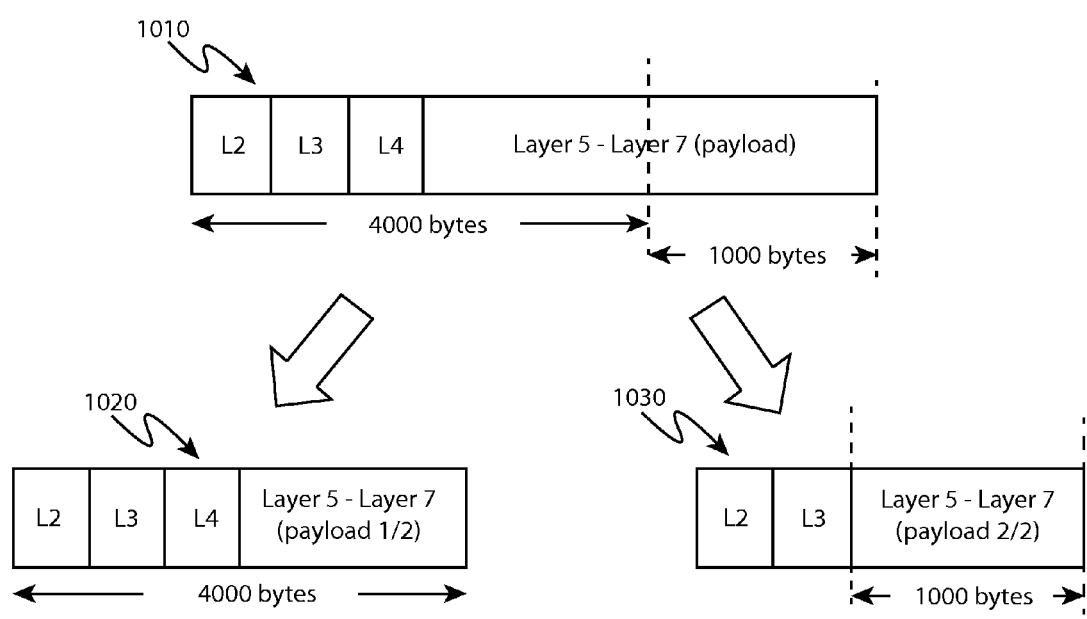
FIG. 10 illustrates a packet that is fragmented into two fragments, in accordance with an example embodiment of the present disclosure.

If the host source node 905 needs to send a data packet exceeding 4000 bytes, the host source node 905 fragments the data packet such that each fragment is less than or equal to 4000 bytes. The host source node 905 fragments the data packet according to any known fragmentation method in the art. FIG. 10 illustrates a packet 1010 that is fragmented into fragment-1 1020 and fragment-2 1030. In this example embodiment, the packet 1010 has a total length of 5000 bytes. The packet 1010 includes a payload and layer 2 to layer 4 headers. As stated above, the MTU of link 903*a* is 4000 bytes. As a result, the packet 1010 is fragmented at the IP layer (Layer 3) into 2 fragments (e.g., fragment-1 1020 and fragment-2 1030). As illustrated, the fragment-1 1020 has a total 4000 bytes. The fragment-1 1020 includes data from the original Layer 2-Layer 4 headers of the packet 1010 and a first half of the payload. Fragment-2 1030, on the other hand, carries a second half of the payload (having a size of 1000 bytes) and a new layer 2 and layer 3 header is inserted if front of the second half of the payload. It should be noted that the layer 4 header is not copied into the second fragment 1030 because from a layer 3 protocol (IP) point of view, the layer 4 header is also part of the payload.

Referring back to FIG. 9, when the fragments arrive at router 910, the router 910 is configured to do a search based on 5 fields of the packet header, namely: IP Src, IP Dst, protocol, TCP Src, and TCP Dst. Out of these 5 fields, the first 3 fields are part of the layer 3 header and the last 2 fields are part of the layer 4 header. Due to the fragmentation of packet 1010, fragment 1030 does not include a layer 4 header. Thus, with respect to fragment 1030, the router 910 issues a lookup request that includes a key mask that masks the TCP Src field and the TCP Dst field in a key request. In addition, the key mask can mask corresponding fields in the rule set from which the search is performed.

As illustrated, at least a portion of at least one header field can be fragmented from one of the fragments. In such situations, a key mask can be utilized by a router (e.g., router 700 of FIG. 7) to process a received packet. Generally, prior to runtime, each possible set of key masks is provided to the router. Thus, if key masks are intended to be used with a set of rules being compiled by a compiler of the router, the set of key masks that could be applied is given to the compiler.

Embodiments of the present disclosure include a compiler that compiles data structures used to traverse a set of rules such that a router can provide internet services as described above. The compiler receives a set of rules along with key mask information to compile the data structures.

Further, according to some embodiments described herein, the data structures include: i) a tree, ii) buckets, and ii) a rule table. A tree includes nodes and leaf nodes. Leaf nodes may be linked to buckets. The leaf nodes may point to buckets, buckets may contain a set of rules. Embodiments described herein may store rules in common tables and the buckets pointed to by leaf nodes may contain rule numbers corresponding to the rules in the rules table. Buckets may include rules in any suitable manner as may be known to one skilled in the art. Each bucket may be a data structure that may include one or more bucket entries. A bucket entry may be a rule, an index to a rule, a pointer to a rule, a pointer to a set of rules, or a pointer to another bucket. A bucket may include a linked list to the rules. A bucket may include entries including any combination thereof. For example, a bucket may have one entry that is a pointer to a rule and one entry that is a pointer to a set of rules, etc. Rule priority may be stored with a rule or linked to a rule in any suitable manner.

Figure 11A:
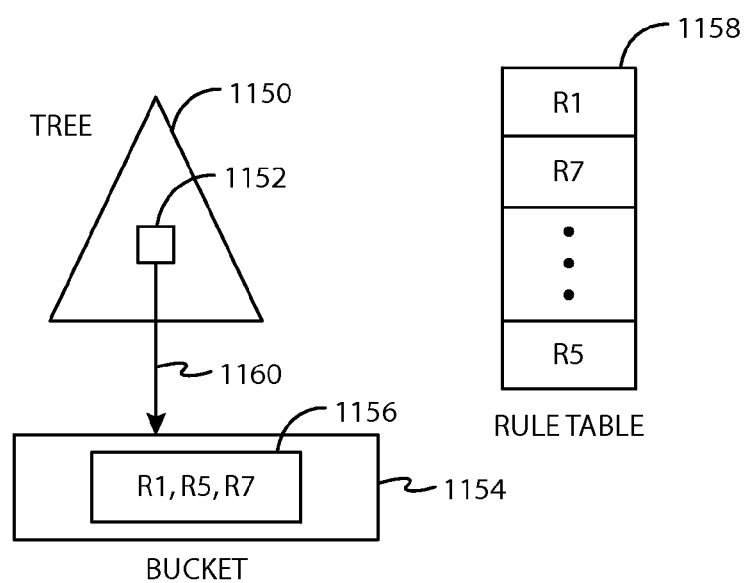
FIG. 11A is an illustration of a tree, a leaf node pointing to a bucket containing a set of rules of a classifier rule table.

FIG. 11A is an illustration of an example embodiment of a tree 1150, a leaf node 1152 pointing to (1160) a bucket 1154 containing a set of rules 1156 of a classifier rule table 1158.

Figure 11B:
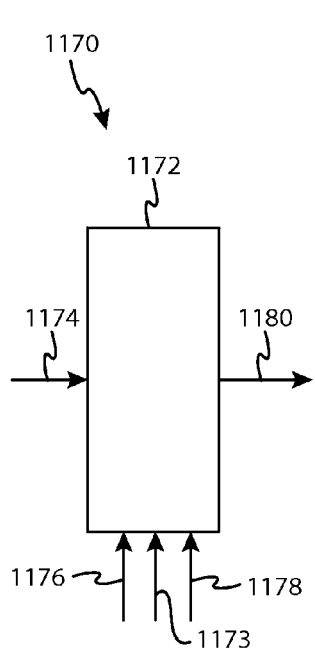
FIG. 11B is a block diagram illustrating an example embodiment of compiling a set of rules into a decision tree data structure.

FIG. 11B is a block diagram 1170 illustrating an example embodiment of compiling a set of rules into a decision tree data structure. A compiler 1172 may receive a rule set 1174, a maximum tree depth 1176, a set of key masks 1173, and a number of sub trees 1178 in, for example, a control plane of a router (e.g., router 700 of FIG. 7). The compiler 1172 generates a set of compiled rules 1180 using the received information.

Figure 11C:
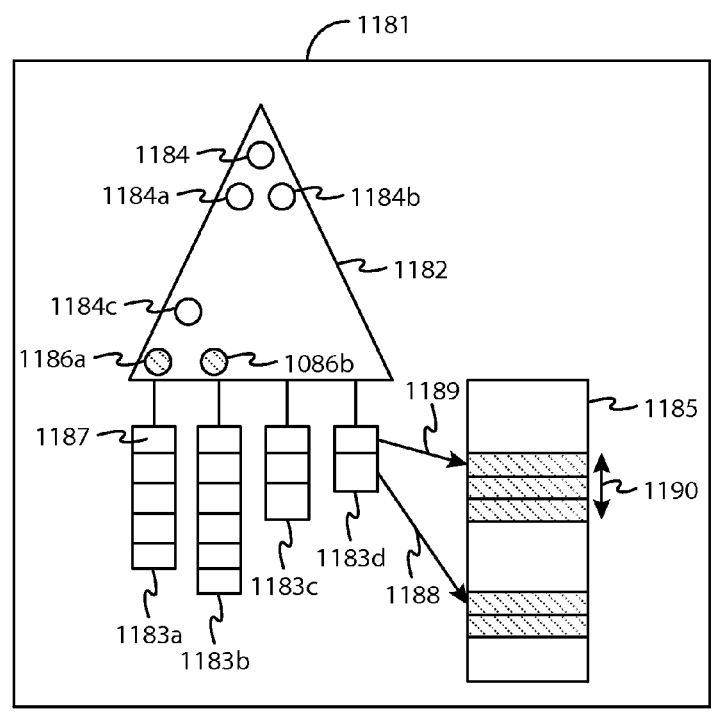
FIG. 11C illustrates a decision tree data structure including a tree, buckets, and rules.

FIG. 11C illustrates a decision tree data structure 1181 including a tree, buckets, and rules. The set of compiled rules 1180 may generate a set of decision trees data structure 1181 including a tree 1182, buckets 1183*a-d*, and rules 1185. The tree 1182 may include a root node 1184, nodes 1184*a-c*, and leaf nodes 1186*a-b*. Each leaf node 1186 of the tree 1182 points to a bucket 1183. Each bucket may include one or more bucket entries 1187. A leaf node may include bucket information that may be used to locate the bucket entries or a bucket list of entries. A bucket entry may be a pointer to rule (1188), or a pointer (1189) to a set of rules (1190). The set of rules 1190 may be a sequential group of rules, or a group of rules scattered throughout the memory, either organized by a plurality of pointers or by a method used to recollect the set of rules. The set of rules 1090 may also be called a chunk, or a chunk of rules. A bucket entry that points to the set of rules 1090 may be called a chunk pointer.

In an example embodiment, the compiler 1172 produces a separate data structure (e.g., a set of search trees) for each key mask from the set of key masks 1173. In addition, the compiler 1172 produces a set of search trees corresponding to no key mask (e.g., none of the fields of the rules are masked out). When a search request comes in, the appropriate set of search trees is chosen based on a key mask passed along with the key request 730. The chosen set of search trees is then searched by a search processor (e.g., the search processor 715 of FIG. 7).

Figure 12:
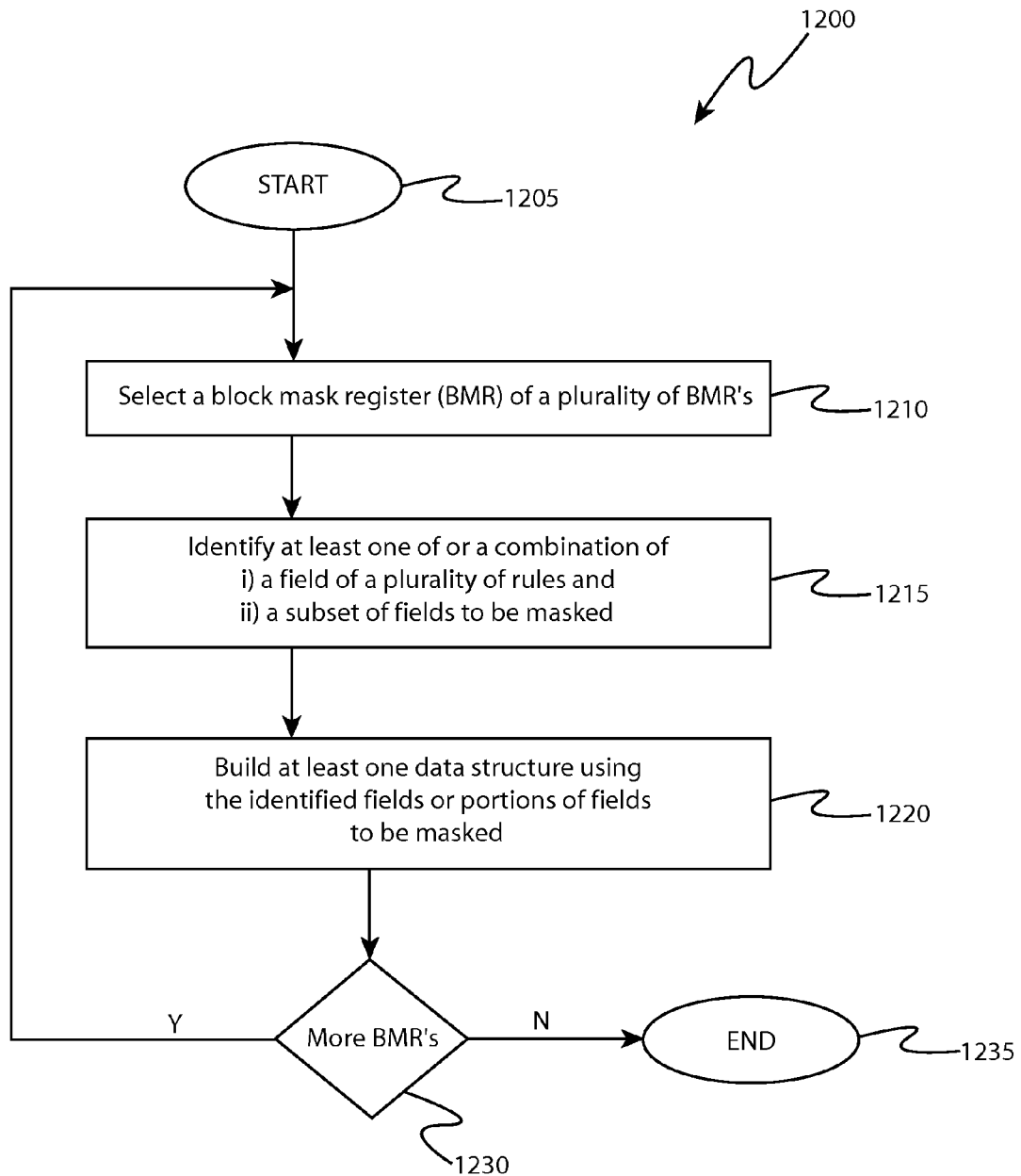
FIG. 12 illustrates a method for producing at least one data structure (e.g., at least one search tree) for each key mask (block mask register) of a plurality of key masks, in accordance with an example embodiment of the present disclosure.

FIG. 12 illustrates an example method 1200 for producing at least one data structure (e.g., at least one set of search trees) for each key mask (block mask register) of a plurality of key masks. The method 1200 can be performed by, for example, the compiler 1172. The compiler 1172 can be part of packet classification services (e.g., the packet classifications services 220) of a router. The method begins at 1205. At 1210, the method 1200 includes selecting a block mask register (BMR) of a plurality of BMRs provided to the compiler 1172. The method 1200, at 1215, includes identifying at least one of or a combination of: i) at least a portion of a field of a plurality of rules and ii) a subset of fields of the plurality of fields to be masked. The identification is based on a mask associated with the selected BMR. It should be noted that a BMR can indicate that no fields are to be masked.

At 1220, the method 1200 includes building at least one data structure used to traverse a plurality of rules based on the identified at least one of or a combination of: i) at least a portion of a field of a plurality of rules and ii) a subset of fields of the plurality of fields to be masked. The data structure can be built using any known method. For example, a breadth first search tree or a depth first search tree can be built. As mentioned above, the data structures contain three basic components, namely: tree, buckets and rules. A tree contains nodes and leaf nodes. Each node uses some bits from a subset of fields of the rules to traverse to its next level i.e. its children. The method by which bits are chosen to build tree can be accomplished by any known method in the art. Embodiments of the present disclosure, while building a data structure (a set of trees) for a particular BMR, mask fields or portion of fields identified by a BMR (key mask). Those fields or portion of fields are not used to create children nodes of trees. The method 1200, at 1230, determines if there are any more BMRs for which a data structure has yet to be built by the compiler. If there are additional BMRs, the method 1200 continues at 1210 for a next BMR. Otherwise, the method 1200 ends at 1235.

For a given key mask (BMR), each field can be untouched, have a few bits masked out, or be completely masked out. Completely masked-out fields are ignored by the compiler (i.e., no tree nodes cut on the masked-out fields and bucket searches ignore those fields)

The compiler modifies partially masked-out fields at the beginning of compilation of the data structure. In particular, the compiler turns each of the partially masked-out fields into a mask field. Subsequently, the compiler turns each rule's value for the field into a value/mask pair. The compiler then modifies each rule's mask to add the key mask's don't-care bits (e.g., the masked out portions of the fields). The compiler then compiles the modified rules normally.

As an example of a partially masked-out field, consider a 32-bit prefix field with a rule field of: 127.0.0.0/8. This means that the first 8 bits of the field must match the value 127 (hex 7F) and the rest are don't-care. Changing this to a mask field gives: 7F000000/FF000000, which means exactly the same thing. The first hex number is the value to be compared against the key, and the second masks the comparison. In particular, a 1 bit in the mask means that the corresponding value bit must match the key, a 0 means ignore the bit. If the key mask bits for this field were hex 3F000000, it would mean the first two bits and the last 24 should be don't-care. This would change the rule's field to: 7F000000/3F000000

Figure 13:
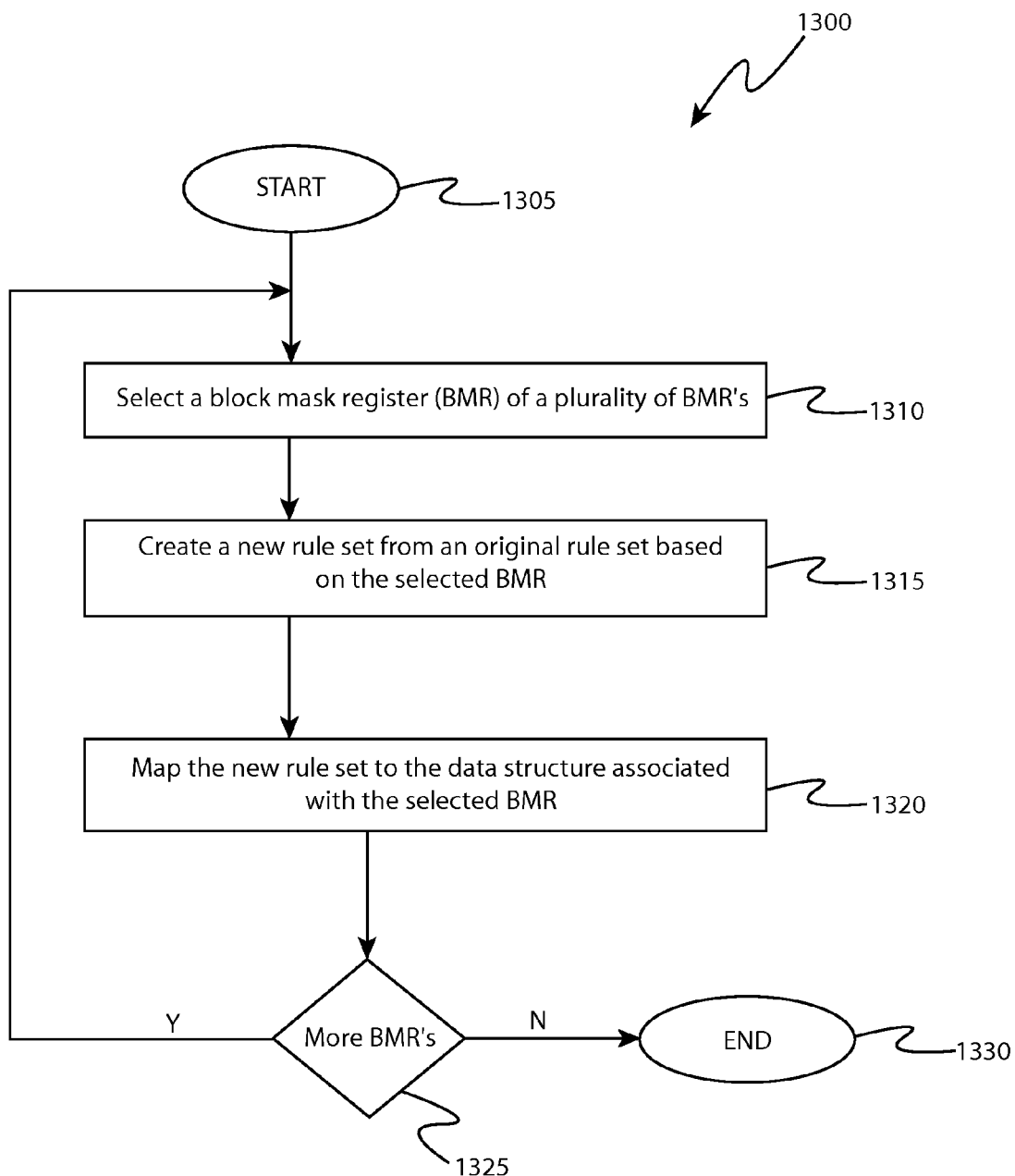
FIG. 13 illustrates a method for creating a new rules set for each data structure produced by the method of FIG. 12, in accordance with an example embodiment of the present disclosure.

As stated above, the compiler 1172 receives a rules set from which it produces at least one data structure (e.g., at least one set of search trees) used to traverse the rules set by a search processor (e.g., the search processor 715 of FIG. 7). The rules set includes every field and each portion of every field used by a router to perform the internet services described above. However, if a key mask is applied to a key received by the router, the search processor does not need to traverse the rules set on the fields or portions of at least one field that are masked by the key mask. FIG. 13 illustrates a method 1300 for creating a new rules set for each data structure produced by the method 1200 of FIG. 12. The method 1300 can be performed by, for example, the compiler 1172. The compiler 1172 can be part of packet classification services (e.g., the packet classifications services 220) of a router.

The method 1300 begins at 1305. At 1310, the method 1300 includes selecting a block mask register (BMR) of a plurality of BMRs provided to the compiler 1172. The method 1300, at 1315, includes creating a new rule set from the original rules set received by the compiler 1172. In particular, the compiler 1172 masks the identified at least one of or a combination of: i) the at least a portion of a field of the plurality of rules and ii) the subset of fields of the plurality of fields from the new rule set. In other words, the compiler 1172 masks the new rules set based on the selected BMR. It should be noted that a BMR can indicate that no fields are to be masked. At 1320, the method 1300 includes mapping the new rule set to a corresponding data structure built by the compiler 1172. In an example, the compiler 1172 builds the corresponding data structure using the new rule set. The method 1300, at 1325, determines if there are any more BMRs. If there are additional BMRs, the method 1300 continues at 1310 for a next BMR. Otherwise, the method 1300 ends at 1330.

As stated above, the compiler 1172 receives an original rules set from which it produces at least one data structure (e.g., at least one set of search trees) used to traverse the rules set by a search processor (e.g., the search processor 715 of FIG. 7). The rules set includes every field and each portion of every field used by a router to perform the internet services described above. However, if a key mask is applied to a key received by the router, the search processor does not need to traverse the rules set on the fields or portions of at least one field that are masked by the key mask. In some example embodiments, a key mask can be applied to a key if the key is larger than all sets of rules that are to be searched by the search processor.

Figure 14:
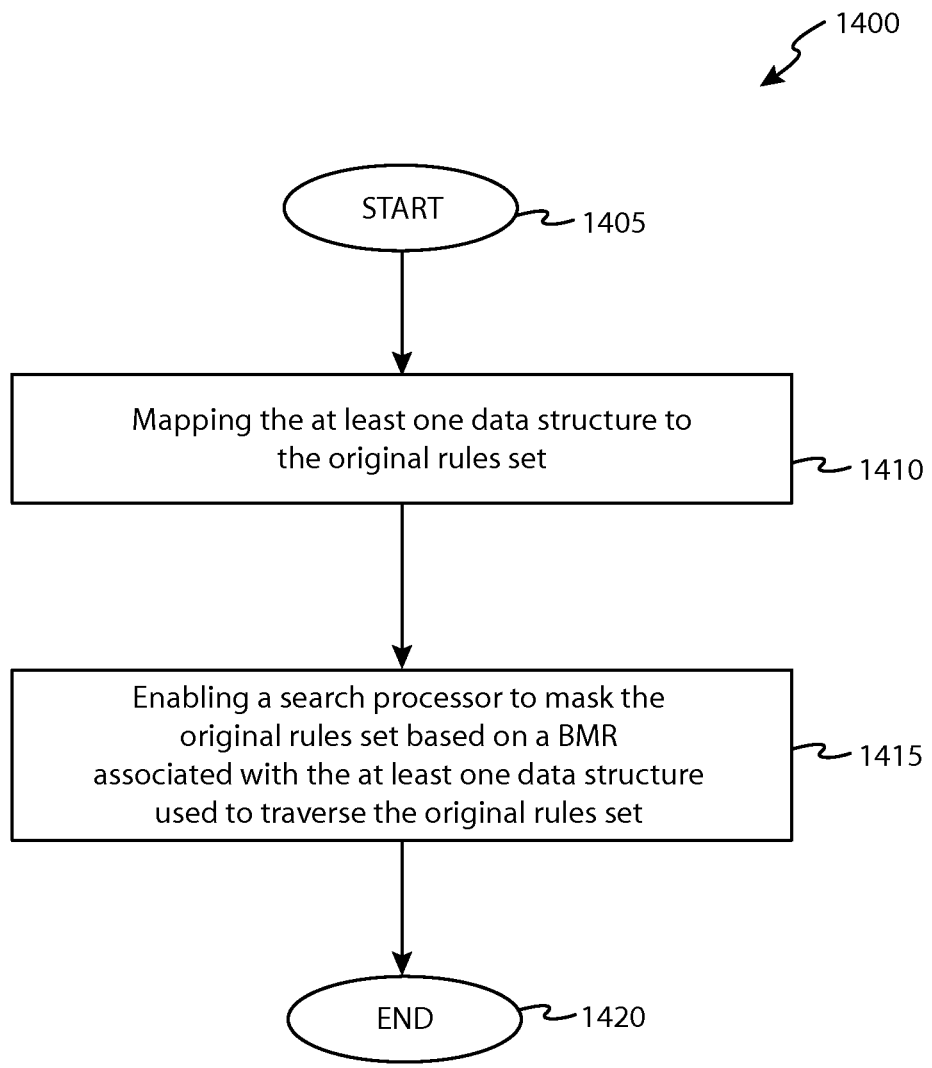
FIG. 14 illustrates a method for enabling the search processor to traverse a data structure based on particular block mask register and select a rule from and original rules set received by a compiler, in accordance with an example embodiment of the present disclosure.

FIG. 14 illustrates a method 1400 for enabling the search processor to traverse a data structure based on particular block mask register and select a rule from the original rules set. In this example embodiment, only a single instance of the original rules set is maintained. The method 1400 begins at 1405. At 1410, the method 1400 maps each data structure created by the compiler 1172 according to, for example, the method 1200 of FIG. 12. In particular, for each BMR of the plurality of BMRs, the method 1400 maps the at least one data structure to a rules set, wherein the rule set is an n-tuple rule set and includes each field of the n-tuple rule set. The method 1400, at 1415, includes enabling a search processor to mask the identified at least one of or a combination of: i) the at least a portion of a field of the plurality of rules and ii) the subset of fields of the plurality of fields to be masked from the rules set based on information identifying a corresponding BMR associated with the at least one data structure during a runtime search. The method 1400, at 1420, ends.

For example, referring to FIG. 7, once a packet is received, the packet processing unit 710 creates a key and selects one key mask from the associated set of key masks (e.g., key masks 1173) from the packet. The packet processing unit 710 then sends both the key and the selected key mask to the search processor 715. The key mask is used by the search processor 715 to select a corresponding data structure (e.g. a set of search trees) from which to traverse a rules set. Once a leaf node of the search tree is reached, the search processor 715 searches each rule pointed to by the leaf node linearly to find a match. However, if the search tree is built based on a key mask, a linear search of the original rule set cannot occur properly because the original rule set includes every field and each portion of every field used by a router to perform the internet services described above. Thus, the search processor 715 needs to mask the rules pointed to by the leaf node based on the BMR used to create the search tree which is being used to traverse the original rules set and also masks the corresponding bits in key based on the key mask (BMR) before comparing key with rules pointed to by the leaf node.

The compiler 1172, for each data structure created, can for example, provide the search processor with an identifier used to identify the BMR associated with each data structure. Thus, when the search processor 715 traverses a particular search tree, the search processor 715 can mask the rules pointed to by a leaf node of the search tree using information provided by the identifier. In other embodiments, the packet processing unit 710 can provide the search processor 715 with information associated with the BMR that is applied to the key being passed to the search processor 715.

Figure 15A:
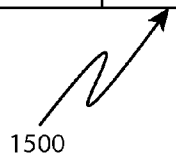
FIG. 15A illustrates a table including rules for classifying a packet, in accordance with an example embodiment of the present disclosure.
Figure 15B:
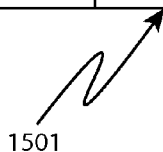
FIG. 15B illustrates a table include block mask registers (BMRs) for masking fields of a key, in accordance with an example embodiment of the present disclosure.

FIG. 15A illustrates a table of rules 1500 that can be used by method 1200 as described above with respect to FIG. 12 for compiling the at least one data structure. In addition, FIG. 15B illustrates a table of BMRs 1501 that can also be used by method 1200 for compiling the at least one data structure. The table of BMRs 1501 includes three BMRs, BMR1-BMR3. Each BMR contains a mask that is applied to each field of each rule. It should be noted that any BMR can mask any arbitrary bits of the key or rule, i.e., masked bits need not be contiguous.

Figure 15C:
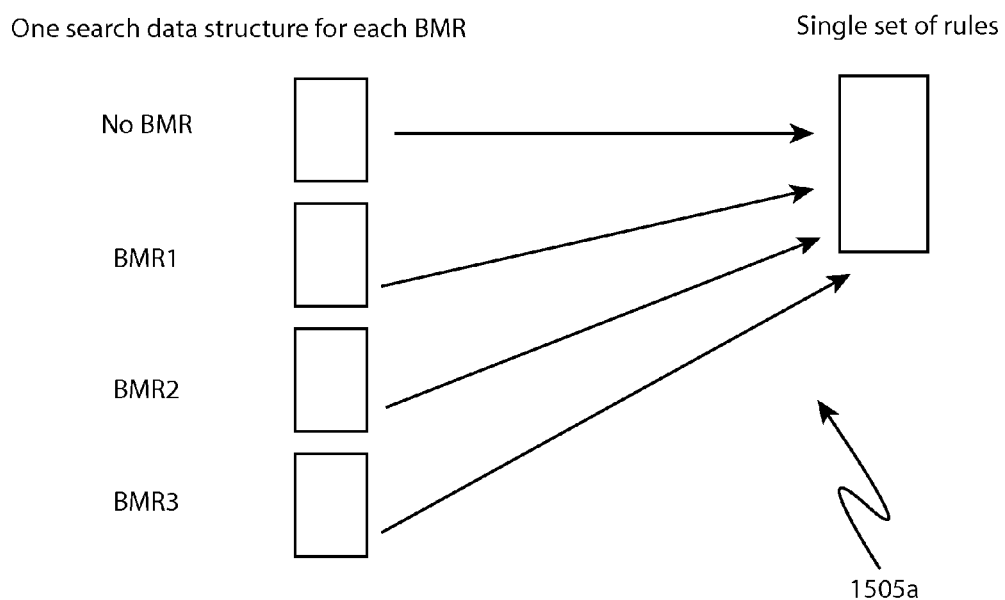
FIG. 15C illustrates mapping of data structures to at least one rules set, in accordance with an example embodiment of the present disclosure.
Figure 15C:
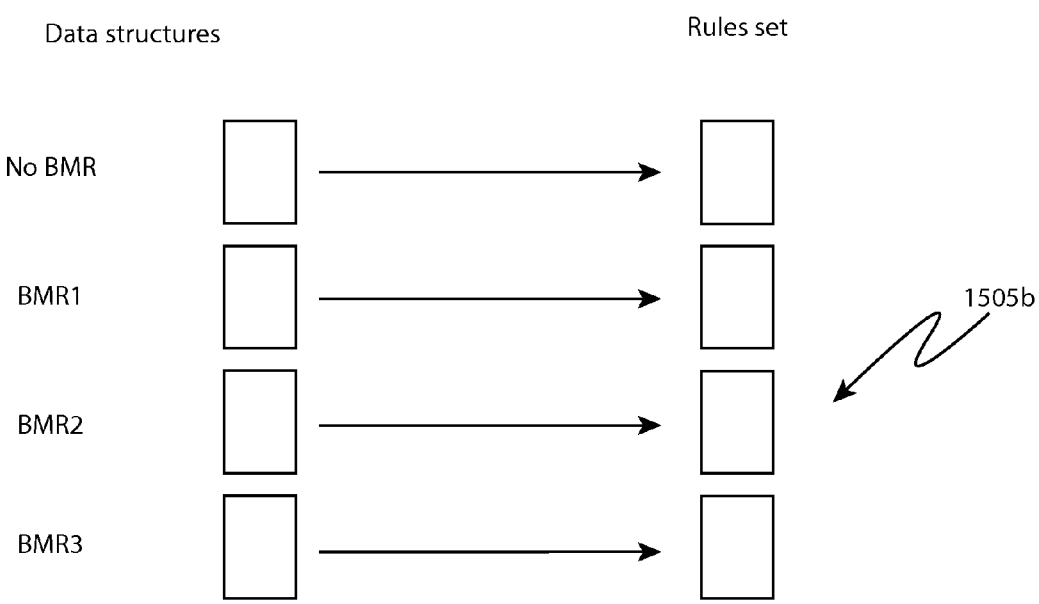

The compilation of the at least one data structure can result in a single set of rules to which each of the compiled data structures are mapped. In another embodiment, the compilation can result in a unique set of rules created for each of the at least one data structures. FIG. 15C illustrates a mapping of data structures for each of the BMRs according to each embodiment described above. In particular, mapping 1505*a* illustrates the embodiment in which each data structure compiled for each BMR is mapped to a single set of rules. Mapping 1505*b* illustrates a mapping of each data structure to a set of rules unique to each of the data structures.

Figure 15D:
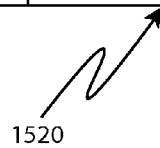
FIG. 15D illustrates a table of rules that are masked during runtime of a search processor, in accordance with an example embodiment of the present disclosure.

FIG. 15D illustrates a table of rules 1520 that are masked during runtime of a search processor. The rules are partially masked by at least one BMR. For example, fields F1 and F4 are changed to mask fields, and the rule values for them are modified accordingly. For example, during a search of a rules set, the search processor upon reaching a leaf node, does a linear search with all rules in the leaf node using key. Since rules are stored in priority order in any leaf, linear search stops at a first match in the list. During this process of linear searching, the search processor uses the key mask corresponding to the BMR ID passed (along with the key request) to mask fields or portion of fields in both the key as well as the subject rules being compared.

In one example, a five-field key can include the following values for each field: F1) 0x1001; F2) 2000; F3) 0x08; F4) 0x0A0B0C01; and F5) 20.30.40.50. The BMR that is passed with the key can be BMR2 of FIG. 15B. In an example, embodiment a leaf node for a data structure corresponding to BMR2 may only include rule R2 of FIG. 15A. The search processor then compares the five-field key with rule R2. For instance, each of the fields are evaluated as follows: F1: The key value 0x1001 is compared against the rule value 0x1001/0xFFFF and matches. F2: The field is ignored because it is completely masked out by BMR2. F3: The key value 0x08 is compared against the rule value 0x00/0x00 and matches. F4: The key value 0x0A0B0C01 is compared against the rule value 0x0A0B0C0D/0xFFFFFF00 and matches. F5: The field is ignored because it is completely masked out. In this example, each field comparison succeeds; thus, the key matches rule R2.

Figure 16:
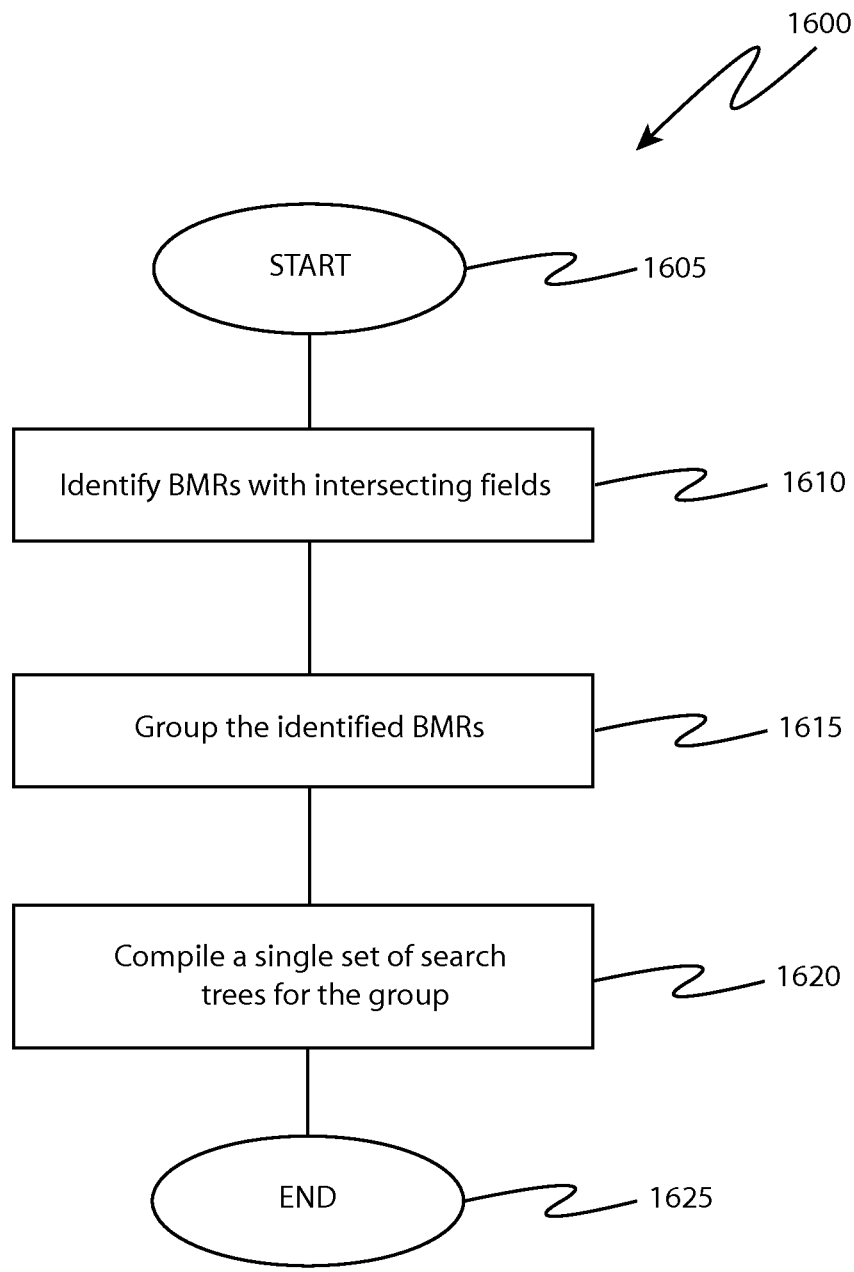
FIG. 16 illustrates a method for grouping BMRs, in accordance with an example embodiment of the present disclosure.

In some embodiments of the present disclosure, a compiler may only compile a set of search trees for a group of BMRs. FIG. 16 illustrates a method 1600 for grouping BMRs and compiling a set of search trees for the groups of BMRs. The method 1600 begins at 1605. At 1610, the method 1600 includes identifying BMRs in a table of BMRs with intersecting fields. For instance, a BMR intersects with another BMR if there is a non-empty set of fields which neither of them mask. The fields in this set are called intersecting fields. For instance, for a 5-field BMR, if BMR 1 only masks field 1 and BMR 2 masks fields 1 and field 2, the two BMRS intersect at fields 3-5. The method, at 1615, includes grouping the identified BMRs. In particular, the method, at 1615, defines a group BMR masking all but the intersecting fields in the group. At 1620, the method 1600 includes compiling a set of search trees for the identified group. In particular, the method 1600, at 1620, includes building the at least one data structure for the group based on the new defined group BMR. At 1625, the method ends.

In an example embodiment, imagine the following BMRs of 4 fields: (F1, F2, F3, F4). BMR1 masks—F2 and F4 and BMR2 masks F1 and F3. In that case, a separate group will have only single BMR as BMR1 and BMR2 do not intersect. In another example, imagine following BMRs of 5 fields: (F1, F2, F3, F4, F5). BMR1 masks—F2 and F4 and BMR2 masks—F2 and F3. In that case, we can have single group with new BMR, let's call it BMRg. BMRg masks—F2, F3, and F4. A data structure for the group is built as per this new BMRg. It should be noted that BMRg is only used for building data structure but the search processor uses individual original BMRs while searching. It should also be noted in this example, each BMR masks complete fields, but it will extend for partial masked fields and in that case BMRg is defined at bit level rather than field level.

As used in this disclosure, a subset of a set can include one or more than one, including all, members of the set. Further, as used in this disclosure, a first variable is an increasing function of a second variable if the first variable does not decrease and instead generally increases when the second variable increases. On the other hand, a first variable is a decreasing function of a second variable if the first variable does not increase and instead generally decreases when the second variable increases. In some embodiment, a first variable is an increasing or a decreasing function of a second variable if, respectively, the first variable is directly or inversely proportional to the second variable.

It should be understood that the block, flow, network diagrams may include more or fewer elements, be arranged differently, or be represented differently. It should be understood that implementation may dictate the block, flow, network diagrams and the number of block, flow, network diagrams illustrating the execution of embodiments described herein.

It should be understood that elements of the block, flow, network diagrams described above may be implemented in software, hardware, or firmware. In addition, the elements of the block, flow, network diagrams described above may be combined or divided in any manner in software, hardware, or firmware. If implemented in software, the software may be written in any language that can support the embodiments disclosed herein. The software may be stored on any form of computer readable medium, such as random access memory (RAM), read only memory (ROM), compact disk read only memory (CD-ROM), and other non-transitory forms of computer readable medium. In operation, a general purpose or application specific processor loads and executes the software in a manner well understood in the art.

While this invention has been particularly shown and described with references to example embodiments thereof, it will be understood by those skilled in the art that various changes in form and details may be made therein without departing from the scope of the invention encompassed by the appended claims.

The invention claimed is:

1. A method, executed by one or more processors, for compiling data structures to process keys associated with a block mask register (BMR) of a plurality of BMRs, the method comprising:
for each BMR of the plurality of BMRs:
identifying at least one of or a combination of: i) at least a portion of a field of a plurality of rules and ii) a subset of fields of the plurality of fields to be masked;
building at least one data structure used to traverse a plurality of rules based on the identified at least one of or a combination of: i) at least a portion of a field of a plurality of rules and ii) a subset of fields of the plurality of fields to be masked; and
creating a new rule set from the plurality of rules, wherein the identified at least one of or a combination of: i) the at least a portion of a field of the plurality of rules and ii) the subset of fields of the plurality of fields to be masked is masked from the new rule set.

2. The method of claim 1 further comprising:
mapping the new rule set to a corresponding data structure traversable on a plurality of rules only on the identified at least one of or a combination of: i) at least a portion of a field of a plurality of rules and ii) a subset of fields of the plurality of fields to be masked.

3. The method of claim 1 further comprising:
for each BMR of the plurality of BMRs, mapping the at least one data structure to a single instance of a rules set, wherein the rule set is an n-tuple rule set and includes each field of the n-tuple rule set.

4. The method of claim 3 further comprising:
enabling a search processor to mask the identified at least one of or a combination of: i) the at least a portion of a field of the plurality of rules and ii) the subset of fields of the plurality of fields to be masked from the rules set based on information identifying a corresponding BMR associated with the at least one data structure; and
enabling search processor to mask the a search request key based on corresponding identified portion of a subject BMR of the plurality of BMRs passed with the search request key.

5. The method of claim 1 further comprising:
identifying a set of BMRs of the plurality of BMRs with intersecting fields;
grouping the identified set of BMRs into a group;
defining a group BMR masking all but the intersecting fields in the group; and
building the at least one data structure for the group based on the new defined group BMR.

6. An apparatus comprising:
a memory;
one or more processors coupled to the memory, the one or more processors configured to:
for each BMR of the plurality of BMRs:
identify at least one of or a combination of: i) at least a portion of a field of a plurality of rules and ii) a subset of fields of the plurality of fields to be masked;
build at least one data structure used to traverse a plurality of rules based on the identified at least one of or a combination of: i) at least a portion of a field of a plurality of rules and ii) a subset of fields of the plurality of fields to be masked; and
create a new rule set from the plurality of rules, wherein the identified at least one of or a combination of: i) the at least a portion of a field of the plurality of rules and ii) the subset of fields of the plurality of fields to be masked is masked from the new rule set.

7. The apparatus of claim 6 wherein the one or more processors are further configured to:
map the new rule set to a corresponding data structure traversable on a plurality of rules only on the identified at least one of or a combination of: i) at least a portion of a field of a plurality of rules and ii) a subset of fields of the plurality of fields to be masked.

8. The apparatus of claim 6 wherein the one or more processors are further configured to:
for each BMR of the plurality of BMRs, map the at least one data structure to a rules set, wherein the rule set is an n-tuple rule set and includes each field of the n-tuple rule set.

9. The apparatus of claim 8 wherein the one or more processors are further configured to:
enable a search processor to mask the identified at least one of or a combination of: i) the at least a portion of a field of the plurality of rules and ii) the subset of fields of the plurality of fields to be masked from the rules set based on information identifying a corresponding BMR associated with the at least one data structure.

10. The apparatus of claim 6 wherein the one or more processors is further configured to:
identify a set of BMRs of the plurality of BMRs with intersecting fields;
group the identified set of BMRs into a group;
define a group BMR masking all but the intersecting fields in the group; and
build the at least one data structure for the group based on the new defined group BMR.

11. An apparatus comprising:
a memory;
one or more processors coupled to the memory, the one or more processors configured to:
for each BMR of a plurality of BMRs:
build at least one decision tree used to traverse a plurality of rules,
create a new rule set from the plurality of rules, and
wherein each BMR masks at least at least one of or a combination of: i) at least a portion of a field of a plurality of rules and ii) a subset of fields of the plurality of fields.

12. The apparatus of claim 11 wherein the one or more processors are further configured to:
map the new rule set to a corresponding decision tree traversable on a plurality of rules only on the identified at least one of or a combination of: i) at least a portion of a field of a plurality of rules and ii) a subset of fields of the plurality of fields.

13. The apparatus of claim 11 wherein the one or more processors are further configured to:
for each BMR of the plurality of BMRs, map the at least one decision tree to a rules set, wherein the rule set is an n-tuple rule set and includes each field of the n-tuple rule set.

14. The apparatus of claim 13 wherein the one or more processors are further configured to:
enable a search processor to mask the identified at least one of or a combination of: i) the at least a portion of a field of the plurality of rules and ii) the subset of fields of the plurality of fields to be masked from the rules set based on information identifying a corresponding BMR associated with the at least one decision tree.

15. The apparatus of claim 11 wherein the one or more processors is further configured to:
identify a set of BMRs of the plurality of BMRs with intersecting fields;
group the identified set of BMRs into a group;
define a group BMR masking all but the intersecting fields in the group; and
build the at least one decision tree for the group based on the new defined group BMR.

* * * * *